US008632091B2

(12) United States Patent
Shaw et al.

(10) Patent No.: US 8,632,091 B2

(45) Date of Patent: Jan. 21, 2014

(54) DRAWBAR PIN RETENTION DEVICE

(75) Inventors: Matthew Shaw, Jackson, MN (US); Alan D. Gustafson, Lakefield, MN (US)

(73) Assignee: AGCO Corporation, Duluth, GA (US)

( * ) Notice: Subject to any disclaimer, the term of this patent is extended or adjusted under 35 U.S.C. 154(b) by 54 days.

(21) Appl. No.: 13/331,007

(22) Filed: Dec. 20, 2011

(65) Prior Publication Data

US 2013/0154236 A1 Jun. 20, 2013

(51) Int. Cl.

*B60D 1/02* (2006.01)
*B60D 1/60* (2006.01)

(52) U.S. Cl.

CPC .... *B60D 1/02* (2013.01); *B60D 1/60* (2013.01)
USPC .......................................... 280/515; 280/507

(58) Field of Classification Search

USPC ................................. 280/504, 506–508, 515
See application file for complete search history.

(56) References Cited

U.S. PATENT DOCUMENTS

| | | | | |
|---|---|---|---|---|
| 2,593,247 | A * | 4/1952 | Benteman | 280/515 |
| 2,654,613 | A * | 10/1953 | Blair et al. | 280/515 |
| 4,552,377 | A * | 11/1985 | Folkerts | 280/515 |
| 4,579,364 | A * | 4/1986 | Kranz | 280/507 |
| 4,650,207 | A * | 3/1987 | Ackermann | 280/515 |
| 4,783,094 | A * | 11/1988 | Sands | 280/515 |
| 5,769,559 | A * | 6/1998 | Olson | 403/322.1 |
| 6,758,486 | B1 * | 7/2004 | Kollath | 280/515 |
| 7,478,824 | B2 * | 1/2009 | Buerkle et al. | 280/515 |
| 7,516,975 | B2 * | 4/2009 | Lair et al. | 280/515 |
| 7,530,592 | B2 * | 5/2009 | Heitlinger et al. | 280/515 |
| 7,926,832 | B1 * | 4/2011 | Hall | 280/441.2 |
| 2001/0054807 | A1 * | 12/2001 | Homan et al. | 280/515 |
| 2004/0232655 | A1 * | 11/2004 | Heitlinger | 280/515 |
| 2007/0145719 | A1 * | 6/2007 | Heitlinger et al. | 280/507 |
| 2008/0100034 | A1 * | 5/2008 | Maillet | 280/515 |
| 2012/0299271 | A1 * | 11/2012 | Terpsma et al. | 280/515 |

* cited by examiner

*Primary Examiner* — Anne Marie Boehler
*Assistant Examiner* — Maurice Williams

(57) ABSTRACT

In an example embodiment, an automatic engaging drawbar pin retention device includes a biased locking plate configured to retain a drawbar pin within a drawbar bore. The locking plate may be movably coupled to a drawbar clevis between a pin-lock to at least partly cover the bore and prevent removal of the drawbar pin and a pin-unlock condition.

2 Claims, 3 Drawing Sheets

8 70 82 60 64 86 74 76 78 12 46 94 84 48 62 80 26 22 92 86 18 44 10 14 28 24

DRAWBAR PIN RETENTION DEVICE

TECHNICAL FIELD

The present invention relates generally to drawbars for coupling an implement to a vehicle, and more particularly, to drawbar pin retention devices.

BACKGROUND

Drawbars are commonly used to couple implements to agricultural vehicles, such as tractors. For example, a drawbar may have a clevis arranged to receive a tongue of an implement to be towed. The clevis and tongue may have bores through which a drawbar pin is inserted to couple the drawbar and tongue together. To limit the upward movement of the drawbar pin, a cross pin may be inserted through a portion of the drawbar pin extending below the bottom of the drawbar.

Although the afore-mentioned arrangement works well, the use of the cross pin has several drawbacks. First, the cross pin is a non-attached component of the drawbar and thus is often lost over the course of time. In addition, there is nothing to prevent the use of the drawbar pin without the cross pin. Thus, either due to forgetfulness, inexperience, neglect, the inability to find the cross pin, or some other reason, a drawbar pin may be inserted through the drawbar and tongue to couple an implement to the drawbar without the use of a cross pin. In such a situation, the drawbar pin is susceptible to bouncing out of the drawbar during travel over rough ground, creating a hazardous situation in which the trailed implement disconnects from the vehicle.

OVERVIEW

Figure 1:
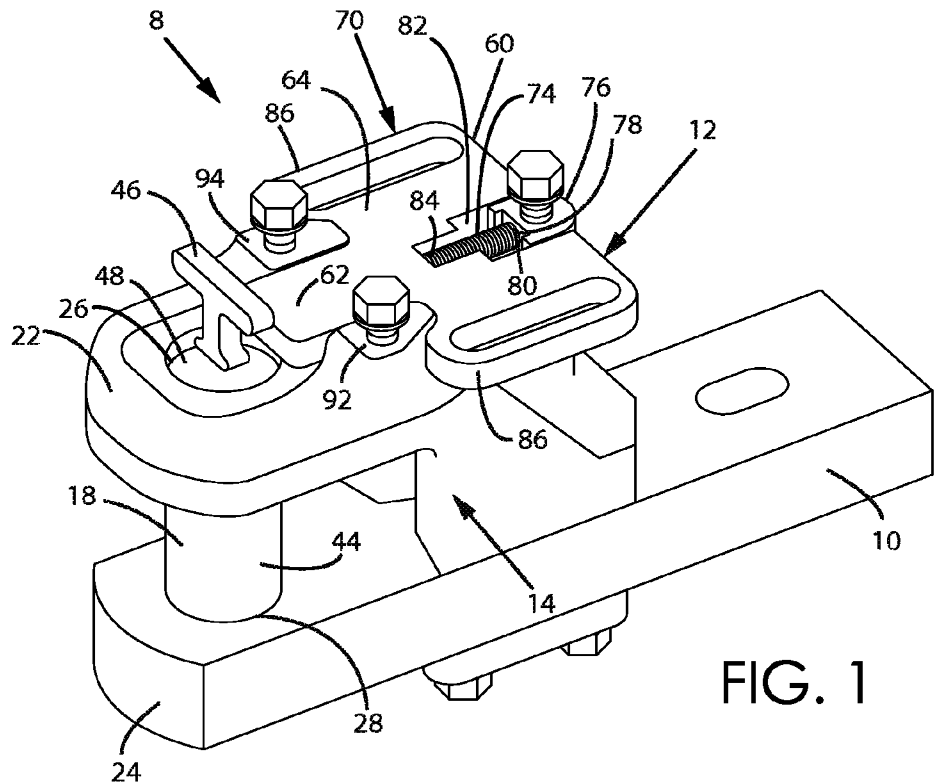
FIG. 1 shows a left front perspective view of an example embodiment of a drawbar having a drawbar pin retention device in which a locking plate is in a pin-lock condition.

In an example embodiment, an automatic drawbar pin retention device includes a biased locking plate configured to retain a drawbar pin within a drawbar bore. The locking plate may be movably coupled to a drawbar clevis and movable between a pin-lock condition and a pin-unlock condition. In one example embodiment, the locking plate is biased to a pin-lock condition to at least partly cover the bore. If a drawbar pin is inserted into the bore, the locking plate is automatically positioned to cover a portion of the bore and limit the movement of the drawbar pin by contact between the drawbar pin and the locking plate.

In an example embodiment, a drawbar pin retention apparatus includes a biased locking plate configured to at least partly cover a bore configured to receive a drawbar pin, a retaining plate configured to retain the locking plate to a drawbar, and biasing means configured to place the locking plate in a pin-lock condition. In an example embodiment, the biasing means may be a spring arranged so that the resilient force of the spring forces the locking plate into a pin-lock condition. In one example embodiment, the spring is arranged to move the locking plate to at least partly cover a bore in the drawbar clevis through which the draw bar pin is inserted. This limits the upward axial movement of the drawbar pin through contact with the locking plate.

The locking plate may be arranged so that in a default condition the locking plate at least partly covers the bore of the clevis. Thus, in order to insert the drawbar pin, an operator moves the locking plate to the pin-unlock condition. Upon release of the locking plate, the locking plate automatically reverts to the pin-lock condition. Thus, after insertion of the drawbar pin and release of the locking plate the drawbar pin is held within the drawbar bore and prevented from bouncing out. The spring may have a spring constant value such that an operator can move the locking plate by hand against the force of the spring to compress the spring and move the locking plate to a pin-unlock condition and upon release of the locking plate by the operator, the spring has sufficient force to move the locking plate into the pin-lock condition. In this arrangement, operator intervention is thus required to move the locking plate for both the insertion and removal of the drawbar pin. This arrangement prevents the installation of a drawbar pin without a means to retain the pin in the drawbar.

A retaining plate may be configured to movably couple the locking plate to the drawbar. In an example embodiment, the retaining plate is bolted to the drawbar clevis to allow removal of the retaining plate for service and assembly of the locking plate and the actuation spring. The space between the retaining plate and an upper surface of the clevis allows for the movement of the locking plate therebetween. Because the locking plate is coupled to the drawbar by the retaining plate, the locking mechanism is always available for use. This eliminates the need to remember or keep track of a separate device, such as a cotter pin, which is easily lost. The drawbar clevis may be arranged to guide and limit movement of the locking plate. For example, the drawbar clevis may be provided with one or more raised portions which contact portion of the locking plate to limit the range of movement of the locking plate.

DETAILED DESCRIPTION OF EXAMPLE EMBODIMENTS

As required, example embodiments of the present invention are disclosed herein. The various embodiments disclosed are meant to be non-limiting examples of various ways of implementing the invention and it will be understood that the invention may be embodied in alternative forms. The present invention will be described more fully hereinafter with reference to the accompanying drawings in which like numerals represent like elements throughout the several figures. The figures are not necessarily to scale and some features may be exaggerated or minimized to show details of particular elements, while related elements may have been eliminated to prevent obscuring novel aspects. The specific structural and functional details disclosed herein should not be interpreted as limiting, but merely as a basis for the claims and as a representative basis for teaching one skilled in the art to variously employ the present invention. For example, while the exemplary embodiments are discussed in the context of an agricultural tractor, it will be understood that the present invention is not limited to use with agricultural tractors but could be used with other vehicles. The use of directional terms such as "up", "upward", "down", "downward", "forward", "rearward", etc. are used to designate directions shown in the drawings and are not meant limit the orientation or any aspect of the invention to a particular direction but to merely provide an understanding of the arrangements in the example embodiments.

Turning to the figures wherein like numbers represent like elements throughout the several views, FIG. 1 shows a drawbar assembly 8 including a drawbar 10 and a drawbar pin retention device 12. The drawbar 10 may have a clevis 14 configured to receive a drawbar pin 18. For example, the drawbar 10 may have an upper hammer strap 22 and a drawbar member 24, each having a bore 26, 28 respectively through which the drawbar pin 18 may be inserted. The upper hammer strap 22 and drawbar member 24 thus form the clevis 14 for receiving a tongue (not shown) of an implement. The tongue may include a bore configured for alignment with the bores 26, 28 of the clevis 14 so that when the tongue is inserted into the clevis 14 the drawbar pin 18 extends through the upper hammer strap 22, the drawbar member 24, and the tongue, thereby coupling the tongue to the drawbar 10.

In the example embodiment shown in FIG. 1, the drawbar pin 18 comprises a generally cylindrically shaped member 44 having a handle 46 at an upper end and a shoulder 48. The bore 26 may include a shoulder recess 52 for receiving the shoulder 48 of the drawbar pin 18. The contact between the shoulder 48 of the drawbar pin 18 with the upper hammerstrap 22 prevents the drawbar pin 18 from falling through the drawbar 10.

Figure 2:
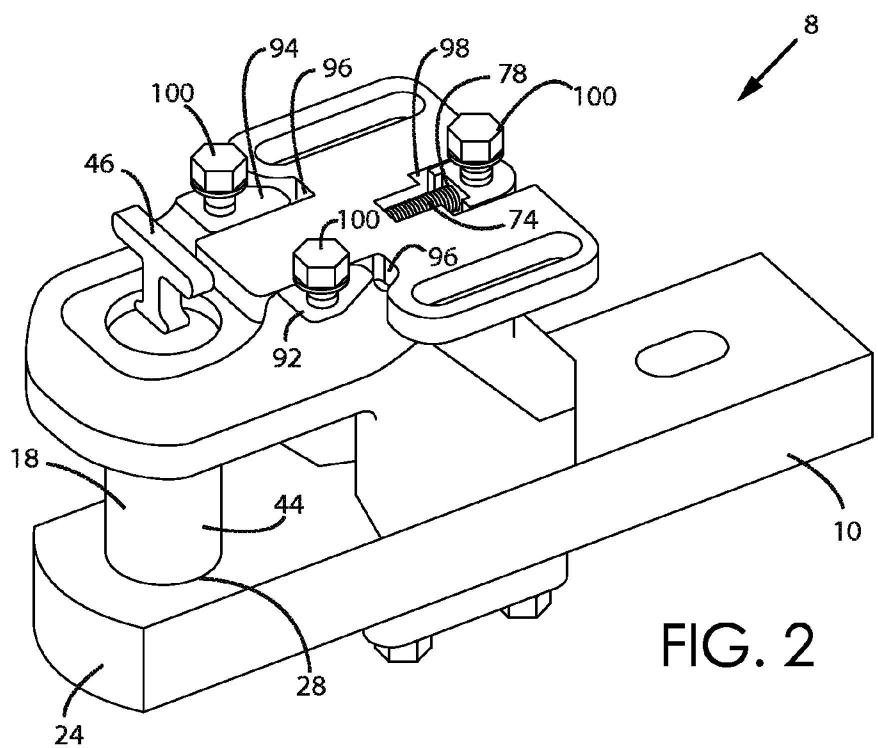
FIG. 2 shows drawbar having a drawbar pin retention device of FIG. 1 in which the locking plate is in a pin-unlock condition.

A biased locking plate 60 may be movably coupled to the clevis 14 and configured to move between a pin-lock condition (FIG. 1) and a pin-unlock condition (FIG. 2). In an example embodiment, the locking plate 60 may be movable between a pin-lock condition in which the locking plate 60 covers a sufficient portion of the drawbar bore 26 to prevent removal of a drawbar pin 18 within the bore (or insertion of the drawbar pin 18 into the bore 26) and a pin-unlock condition in which the locking plate 60 is positioned to allow removal of the drawbar pin 18 from the bore 26 (or insertion into the bore 26). The locking plate 60 may be generally T-shaped having a central portion 62 and shoulders 64.

In an example embodiment a locking plate assembly 70 is arranged as a spring-loaded mechanism in which a spring 74 urges the locking plate 60 to a pin-lock position. The locking plate 60 is thus biased to a pin-lock condition. The locking plate 60 may be movably coupled to the clevis 14 and located adjacent the drawbar pin bore 26. The spring 74 may be positioned between the clevis 14 and the locking plate 60 so as to urge the locking plate over the bore 26 to a pin-lock condition.

In one example embodiment, the drawbar clevis 14 may have a stop for engaging one end of the spring 74. For example, the upper hammerstrap 22 may have a raised portion 76 that serves as a push wall against which the spring 74 pushes. The raised portion 76 may have a recess 78 configured to receive a first end 80 of the spring 74. The locking plate 60 may have a recess 82 for receiving a second end 84 of the spring 74. In this arrangement, shown in FIGS. 1 and 2, the spring 74 pushes the locking plate 60 from the raised portion 76 toward the bore 26. Thus, the spring 74 pushes the locking plate 60 to a pin-lock condition, in which the locking plate 60 is positioned over a portion of the bore 26 to cover the shoulder 48 and a portion of the central member 44 of a drawbar pin 18 within the bore 26. In another embodiment, the locking plate 60 may engage the drawbar pin 18 in some way, such as extending through the pin 18.

The locking plate 60 may be provided with one or more handles 86 to assist a user in grasping the locking plate 60 and moving the locking plate 60 against the force of the spring 74 from an extended pin-lock condition in which the bore 26 is at least partially covered to a retracted pin-unlock condition in which the bore 26 is uncovered. The spring 74 may have a spring constant k high enough to force the locking plate 60 to a pin-lock condition when the locking plate 60 is released by the operator but low enough to allow an operator to move the locking plate 60 to compress the spring 74 and move the locking plate 60 to a pin-unlock position to allow insertion or removal of the drawbar pin 18 from the bore 26. The handles 86 may extend out beyond the upper retaining plate 88 and the hammerstrap 22 body to allow for easy grasping by an operator.

FIG. 1 shows the locking plate 60 in an extended position in which the locking plate 60 partially covers the bore 26 of the clevis 14 and the shoulder 48 of the drawbar pin 18 thereby putting the locking plate 60 in a pin-lock condition which prevents removal and insertion of the drawbar pin 18. FIG. 2 shows the locking plate 60 in a pin-unlock condition, in which the locking plate 60 has been moved by an operator against the force of the spring 74 away from the bore 26 to allow removal of the drawbar pin 18 by pulling upward on the drawbar pin handle 46.

The drawbar clevis 14 may be arranged to accommodate and facilitate movement of the locking plate 60. For example, the upper hammerstrap 22 may be configured to have a generally flat surface 90 upon which the locking plate 60 rests and an arrangement of raised portions 76, 92, 94 that provide a path through which the locking plate 60 moves and limits movement of the locking plate 60.

For example, two forward spaced-apart raised portions 92, 94 may serve as stops to limit the forward movement of the locking plate 60 and provide a pathway through which a portion of the locking plate 60 moves to cover a portion of the bore 26. For example, the shoulders 64 of the locking plate 60 may be provided with a recess 96 to engage the forward raised portions 92, 94 when the locking plate 60 is an extended or pin-lock condition. The forward raised portions 92, 94 and the locking plate 60 may be arranged so that when the spring 74 pushes the locking plate 74 toward the bore 26 the movement of the locking plate 60 is limited by the contact with the raised portions 92, 94 to a position in which the locking plate at least partly covers the bore 26 so that the locking plate 60 is in the pin-lock condition.

As shown in the example embodiment of FIGS. 1 and 2, a rear raised portion 76 may be provided and serve as a push wall as explained above. In addition, the rear raised portion 76 may serve to limit the rearward movement of the locking plate 60 by compression of the spring 74 against the stop 76 which pushes against the locking plate 60. In addition, an interior shoulder 98 of the recess 82 in the locking plate 60 may contact the rear raised portion 76 when the locking plate 60 is moved rearward by the operator to limit rearward movement.

Figure 3:
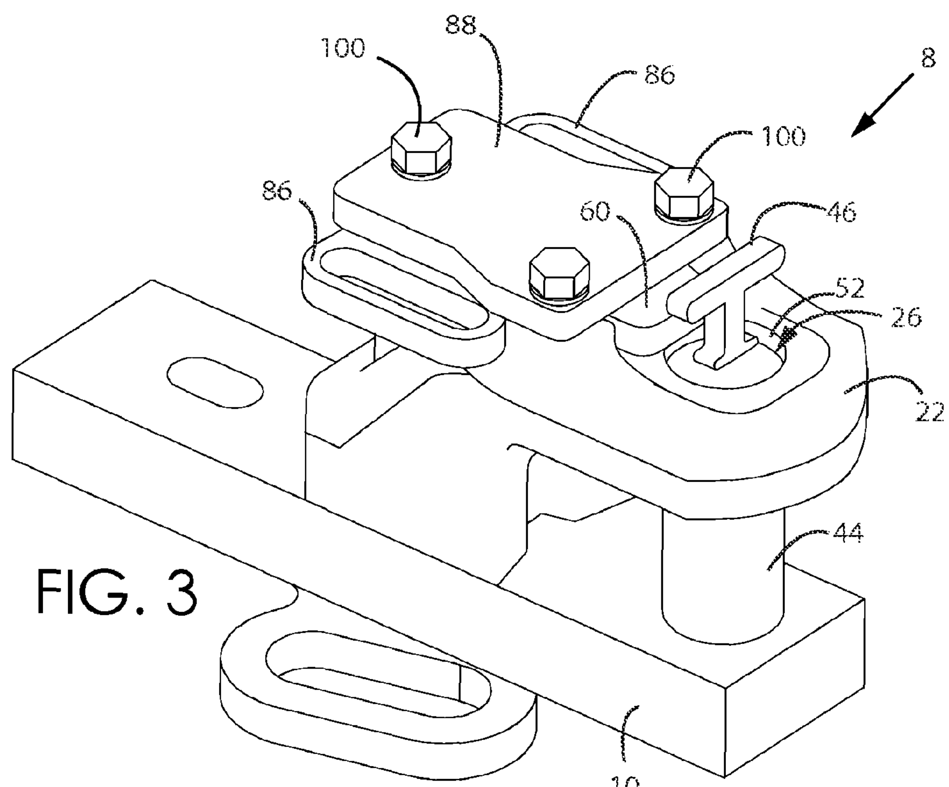
FIG. 3 shows a right front perspective view an example embodiment of a drawbar having a drawbar pin retention device in which a retaining plate is installed.
Figure 4:
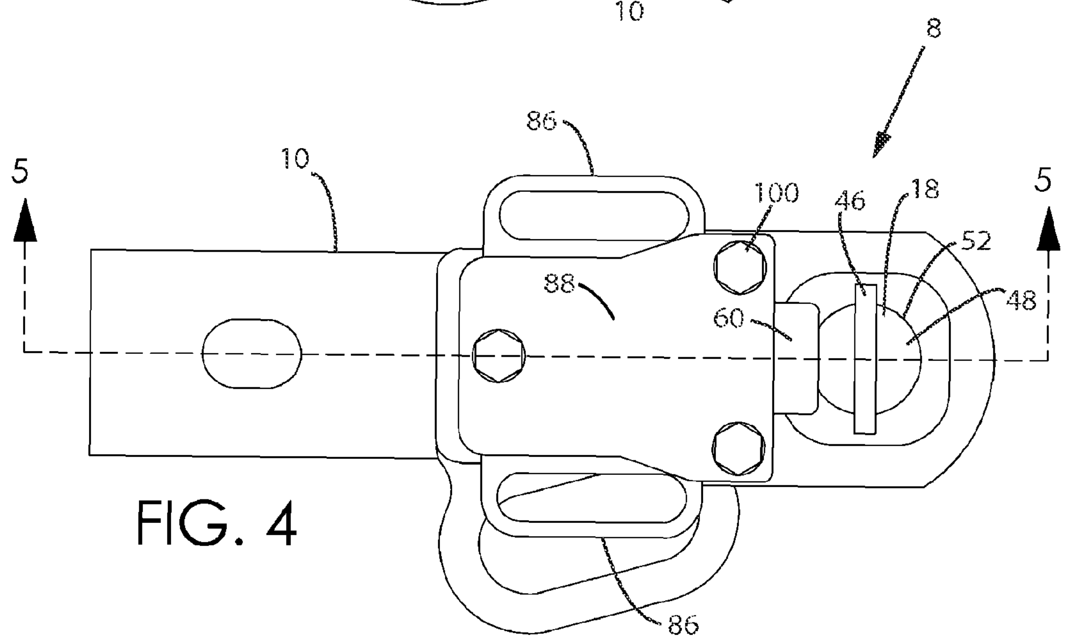
FIG. 4 is a top view of a drawbar having a drawbar pin retention device of FIG. 3.

To further control movement of the locking plate 60, an upper retaining plate 88 may be provided above the locking plate 60 as shown in FIG. 3. For example, the raised portions 76, 92, 94 may serve as mounts upon which the locking plate 60 may be coupled. In an example embodiment, the mounts 76, 92, 94 may include threaded holes for receiving bolts 100 to couple the retaining plate 88 to the clevis 14. The mounts 76, 92, 94 may extend a height above the hammer strap surface 90, and the locking plate 88 be of a thickness such that there is sufficient space between the mounted retaining plate 88 and the surface 90 of the clevis 14 to allow for the movement of the locking plate 60. The retaining plate 88 limits the upward movement of the locking plate 60 and assists in preventing debris from affecting the spring 74 and locking plate 60. The retaining plate 60 may be removed by the removal of bolts 100 to provide access to the locking plate 60 and spring 74 for installation or repair.

Thus, the locking plate 60 may be constrained from forward movement by the contact of the locking plate 60 with the forward mounts 92, 94, constrained in the rearward direction by contact with the rear mount 76, and constrained in the upward direction by the locking plate 88, and constrained in the downward direction by the clevis surface 90. In addition, the locking plate 88 may be constrained in the lateral direction by the contact of the sides the locking plate with the sides of the forward raised portions 92, 94 and the sides of the rear slot 82 of the locking plate 60 with the rearward raised portion 76. Thus, the locking plate 60 may be limited in movement within a desired range and prevented from separating from the clevis 14. This provides a locking means that is readily available to a user.

In operation, the locking plate 60 may be biased to a pin-lock condition in which the locking plate 60 is at least partly obstructing the bore 26 so that a drawbar pin 18 of the appropriate size is blocked from entering the bore 26. To insert the draw bar pin 18, an operator may grasp a handle 46 of the locking plate 60 and move the locking plate 60 away to uncover the bore 26. The arrangement limits the movement of the locking plate 60 rearward to further compress the spring 74 extending between the clevis 14 and the locking plate 60 to further energize the spring 74. The operator may then insert the drawbar pin 18 into the bore 26 and release the locking plate 60. Upon release of the locking plate 60 by the operator, the energized spring 74 pushes the locking plate 60 back to a pin-lock condition in which the locking plate 60 at least partly covers the bore 26. The drawbar pin 18 is now locked in place and prevented from bouncing out of the drawbar. To remove the drawbar pin 18 the operator moves the locking plate 60 rearward to uncover the bore 26. Upon removal of the drawbar pin 18 and release of the locking plate 60, the locking plate 60 once again is moved to the pin-lock condition by the spring 74.

Various examples have been set forth herein to provide an understanding of the invention, but the invention is not limited to the example embodiments and additional embodiments will occur to those skilled in the art. Although the invention has been discussed with respect to specific embodiments, thereof, the embodiments are merely illustrative, not restrictive of the invention. Numerous specific details are provided, such as examples of components and methods, to provide a thorough understanding of the invention. One skilled in the relevant art will recognize, however, that an embodiment of the invention can be practiced without one or more of the specific details, or with other apparatus, systems, methods, components and/or the like.

Figure 5:
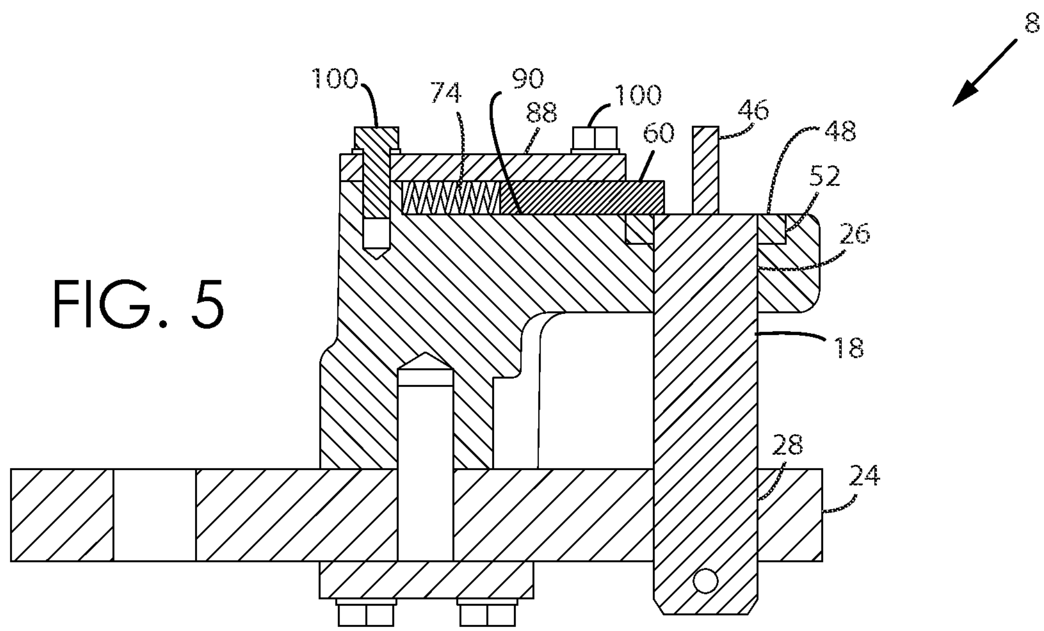
FIG. 5 shows a cross-sectional view of the drawbar and drawbar retention device of FIG. 4 along cut line 5-5 in which the drawbar pin retention device is in a pin-lock condition.
Figure 6:
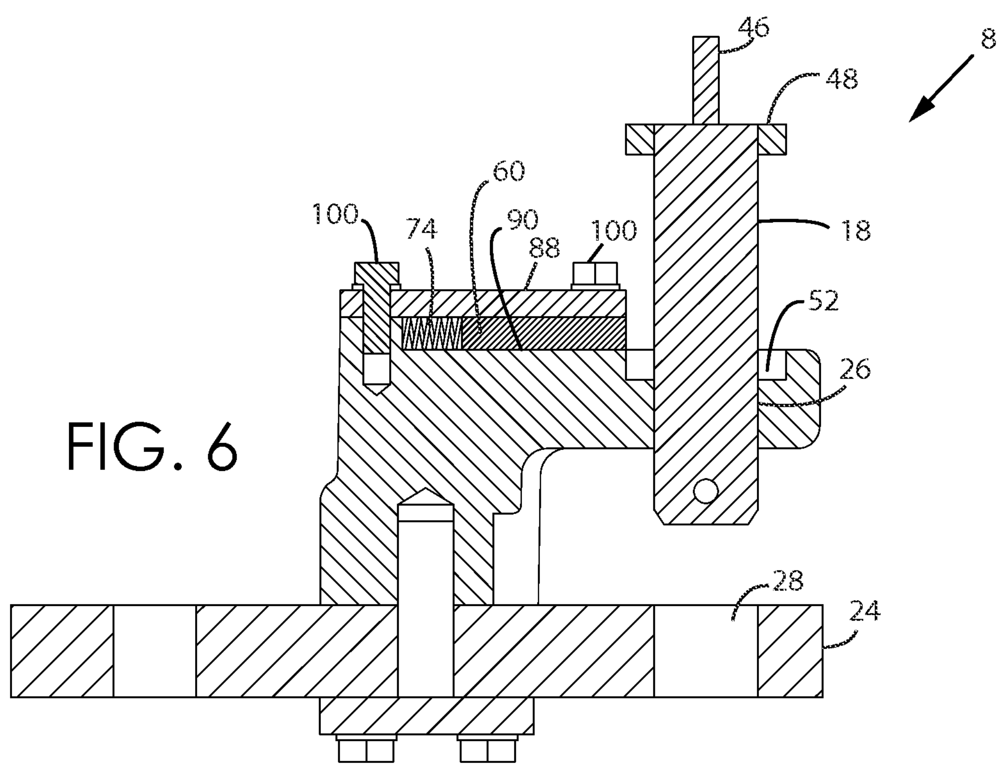
FIG. 6 shows the drawbar of FIG. 5 in which the drawbar retention device is in a pin-unlock condition.

For example, while in the example embodiment, such as FIG. 5, the locking plate 60 is shown as extending over the bore 26 to cover a recess area 52 and a main area of the bore 26 the locking plate 60 could be positioned to cover more or less of the bore 26. In addition, the locking plate 60 could be arranged to engage the drawbar pin 18 in a variety of ways.

What is claimed is:

1. A drawbar pin retention mechanism, comprising:

a drawbar clevis comprising a flat upper surface with a plurality of raised stops extending therefrom and having a bore configured to receive a drawbar pin;

a locking plate movably coupled to the drawbar clevis and configured such that a forward end acts to obstruct at least a portion of the bore when the locking plate is moved into a pin-lock condition, said plurality of stops comprising two forward spaced-apart raised stops and at least one rear raised stop, the forward raised stops forming a path through which the forward end of the locking plate moves to cover the portion of the bore, wherein the locking plate has shoulders extending laterally on either side of the portion of the forward end that obstructs the bore, each shoulder having a recess to engage its respective forward raised stop when the locking plate is in the pin-lock condition so that when a spring pushes the locking plate toward the bore, movement of the locking plate is limited by contact with the forward raised stops;

a retaining plate coupled to the clevis and configured to movably retain the locking plate to the clevis, wherein the raised stops serve as mounts upon which the retaining plate is mounted and the locking plate is of a thickness such that there is sufficient space between the mounted retaining plate and the upper surface of the clevis to allow for the movement of the locking plate;

wherein the spring is received in a recess in a rear end of the locking plate and configured to force the locking plate into the pin-lock condition in which the bore is at least partly obstructed by the forward end of the locking plate, said rear raised stop serving as a push wall against which the spring pushes; and a handle used to move the locking plate against the force of the spring, wherein the locking plate is movable between the pin-lock condition and a pin-unlock condition.

2. The drawbar pin retention mechanism of claim 1, wherein the locking plate is configured to cover a shoulder of a drawbar pin inserted in the bore.

* * * * *